US006334057B1

United States Patent
Malmgren et al.

(10) Patent No.: US 6,334,057 B1
(45) Date of Patent: Dec. 25, 2001

(54) CHANNEL ALLOCATION IN A TELECOMMUNICATIONS SYSTEM WITH ASYMMETRIC UPLINK AND DOWNLINK TRAFFIC

(75) Inventors: Göran Malmgren, Hägersten; Fredric Kronestedt, Stockholm, both of (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/107,472

(22) Filed: Jun. 30, 1998

(51) Int. Cl.[7] ............................................... H04Q 7/20
(52) U.S. Cl. ...................... 455/450; 455/423; 370/329; 370/337; 370/347; 370/442; 370/458
(58) Field of Search ..................... 455/450–452, 455/464, 447, 448, 453, 455, 423; 370/442–444, 458–461, 327, 337, 347, 468

(56) References Cited

U.S. PATENT DOCUMENTS

| | | | |
|---|---|---|---|
| 5,159,593 | * 10/1992 | D'Amico et al. ............... | 370/332 |
| 5,345,598 | * 9/1994 | Dent ................................. | 455/522 |
| 5,428,815 | * 6/1995 | Grube .............................. | 455/447 |
| 5,594,720 | * 1/1997 | Papadopolous et al. ....... | 370/330 |
| 5,666,655 | * 9/1997 | Ishikawa et al. ............... | 455/512 |
| 5,828,948 | * 10/1998 | Almgren et al. ............... | 455/450 |
| 5,884,145 | * 3/1999 | Haartsen ......................... | 455/63 |
| 5,953,344 | * 9/1999 | Dail et al. ....................... | 370/443 |
| 6,115,390 | * 9/2000 | Chuah ............................. | 370/443 |
| 6,122,517 | * 9/2000 | Imamura ......................... | 455/450 |

FOREIGN PATENT DOCUMENTS 0 720 405 A    7/1996   (EP).

WO97/49258    12/1997   (WO).

OTHER PUBLICATIONS

G.J.R. Povey et al., "TDD–CDMA Extension to FDD–CDMA Based Third Generation Cellular System", ICUPC, IEEE (1997), pp. 813–817; and.
I. Katzela et al., "Channel Assignment Schemes for Cellular Mobile Telecommunications Systems: A Comprehensive Survey", IEEE Personal Communications, Jun. 1996, pp. 10–31.
EPO Standard Search Report dated Mar. 25, 1999.

* cited by examiner

Primary Examiner—Dwayne Bost
Assistant Examiner—Charles Craver
(74) Attorney, Agent, or Firm—Burns, Doane, Swecker & Mathis, L.L.P.

(57) ABSTRACT

In a synchronous cellular radio telecommunications network that employs a time division multiple access (TDMA) channel allocation scheme, an effective approach to allocating channels or time slots in a TDMA time frame containing asymmetric downlink and uplink traffic channel fields can be achieved by dividing the downlink and uplink traffic channel fields into a number of regions, based on an expected level of intercell interference associated with each region. In addition, the level of susceptibility to intercell interference for each mobile unit operating in a given cell is continuously established. The allocation of channels or time slots is then carried out for each of the mobile units based on, among other things, the level of susceptibility associated with each of the mobile units, the level of expected intercell interference associated with each of the regions, and whether the channel or time slot is being allocated for the purpose of conveying information in the uplink or downlink traffic channel field.

36 Claims, 4 Drawing Sheets

CHANNEL ALLOCATION IN A TELECOMMUNICATIONS SYSTEM WITH ASYMMETRIC UPLINK AND DOWNLINK TRAFFIC

FIELD OF INVENTION

The present invention generally relates to wireless telecommunications systems, such as cellular radio telecommunications systems. More particularly, the present invention relates to allocating channels in a cellular radio telecommunications system.

BACKGROUND

In a cellular radio telecommunications system, any number of multiple access strategies may be employed, such as, frequency division multiple access (FDMA), time division multiple access (TDMA) and code division multiple access (CDMA). In a system that employs a FDMA strategy, the frequency spectrum is divided into a number of disjunctive frequency bands, wherein each frequency band serves as a separate radio channel. In a system that employs CDMA, different modulation codes, known as spreading codes, are used to distinguish the various radio channels. In a TDMA system, channel separation is accomplished by dividing the time domain into time frames and time slots as described in more detail below.

Figure 1:
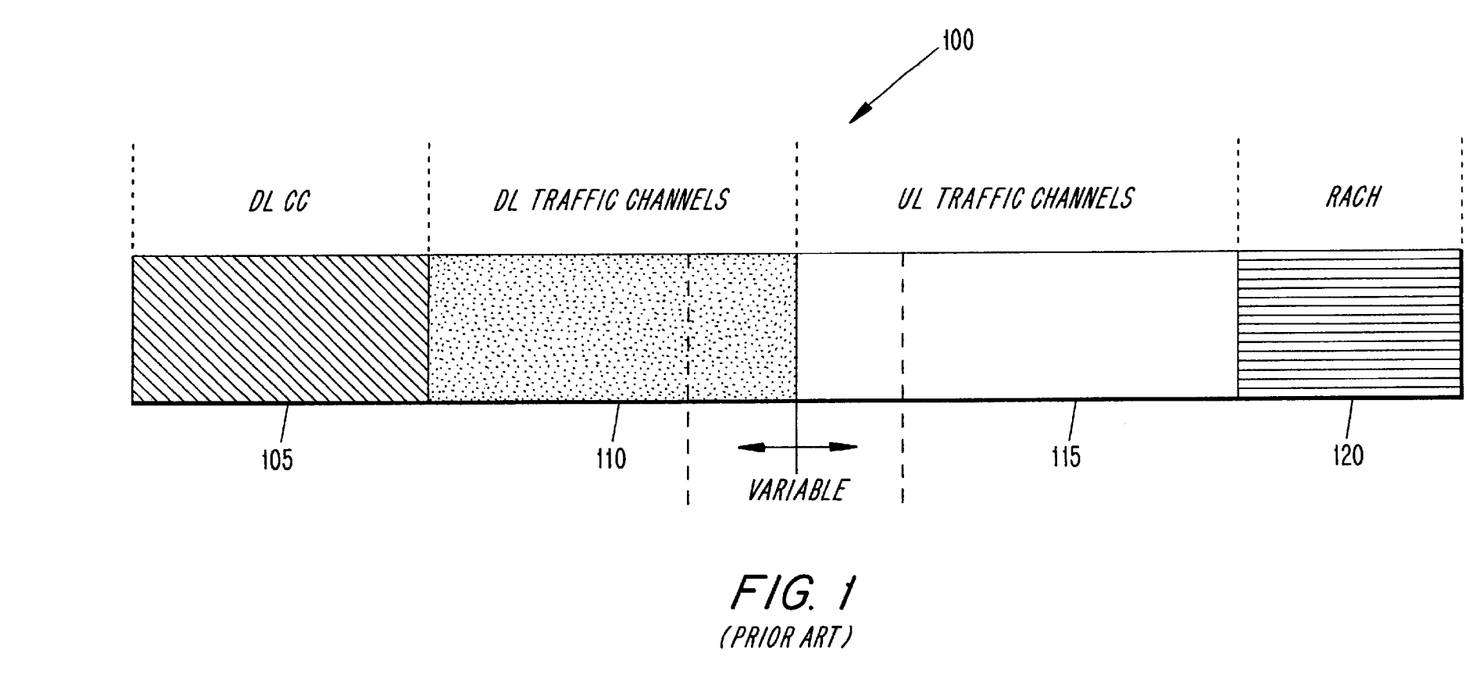
FIG. 1 illustrates a typical TDD-TDMA time frame including asymmetric uplink and downlink traffic channel fields.

FIG. 1 illustrates a typical time division duplex (TDD), TDMA time frame 100. Generally, in a TDD-TDMA based system, the uplink channels and the downlink channels are separated in time over a common frequency. More specifically, FIG. 1 illustrates that the TDD-TDMA time frame 100 is divided into a number of fields including a downlink control channel (DL CC) field 105, a downlink traffic channel field 110, an uplink traffic channel field 115, and a random access channel (RACH) field 120. The downlink traffic channel field 110 and the uplink traffic channel field 115 are still further divided into a number of time slots (not shown). In the case of the downlink traffic channel field 110, a time slot is utilized for carrying information from the cell base station to an assigned mobile unit (e.g., cellular telephone) located in the cell. In the case of the uplink traffic channel field 115, a time slot is utilized for carrying information from an assigned mobile unit in the cell to the cell base station. Typically, the DL CC field 105 contains, among other things, an announcement list which identifies the mobile units that are to receive information from the base station in the current downlink period as well as the time slots during which the identified mobile units are to receive that information. The DL CC field 105 may also contain an assignment list which identifies those mobile units that have been allocated a time slot during the current uplink period. The RACH field 120 is typically utilized for transporting such information as scheduling information and control information, including retransmission requests.

FIG. 1 also illustrates that the TDMA time frame 100 includes an asymmetric uplink/downlink format. This means that the size (i.e., length) of the downlink traffic channel field 110 may be different than the size of the uplink traffic channel field 115. Moreover, this means that the relative size of the downlink traffic channel field 110 compared to the size of the uplink traffic channel field 115 may vary from cell to cell. Consequently, the time period associated with a downlink traffic channel field 110 in a first cell may, to some extent, overlap the time period associated with the uplink traffic channel field 115 in an adjacent or nearby cell, and vice versa.

Figure 2:
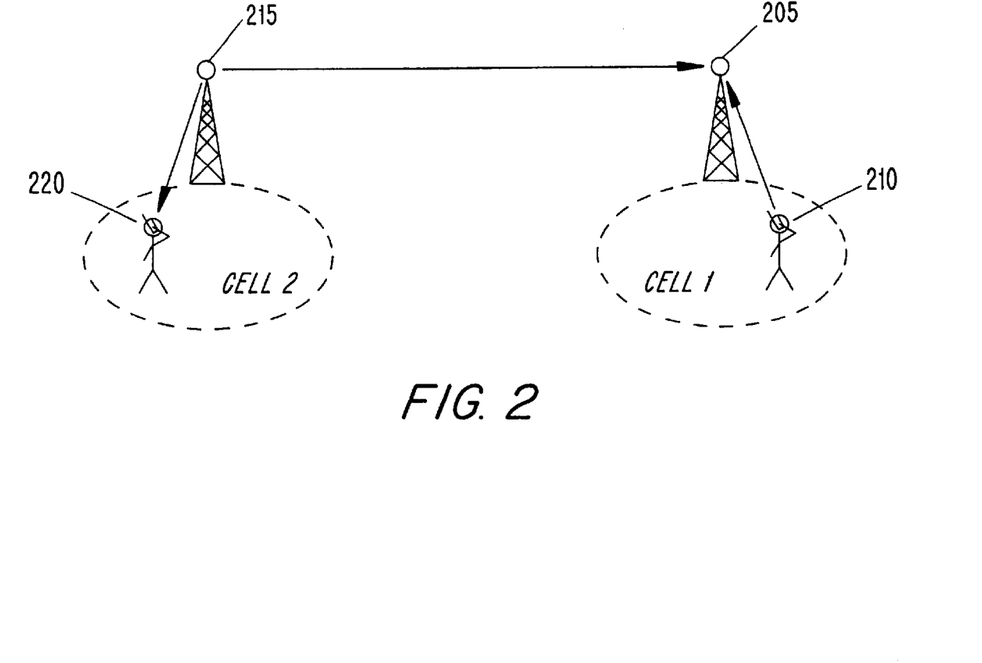
FIG. 2 illustrates intercell interference between base stations.
Figure 3:
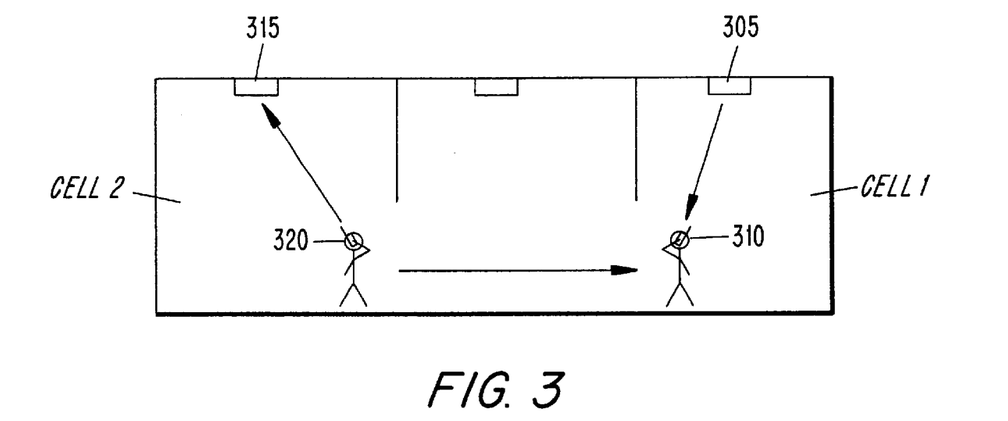
FIG. 3 illustrates intercell interference between mobile units.

When the downlink traffic channel field 110 in one cell overlaps the uplink traffic channel field 115 in an adjacent or nearby cell, the transmission of information in one cell is more likely to disturb the transmission of information in the other cell. That is, the overlap between the downlink traffic channel field 110 in one cell and the uplink traffic channel field 115 in the adjacent or nearby cell is more likely to result in cross-channel and/or co-channel interference. The situation is especially problematic wherein the two cells share (i.e., reuse) a portion of the frequency band, thereby increasing the likelihood of co-channel interference. As illustrated in FIG. 2, for example, if a base station 205 in a first cell is presently receiving uplink transmissions from mobile units located in the first cell, such as mobile unit 210, while a base station 215 in a second cell is presently transmitting downlink messages to various mobile units located in the second cell, such as mobile unit 220, the base station 205 in the first cell may inadvertently receive a transmission from the base station 215 in the second cell. In a second example, as illustrated in FIG. 3, the mobile unit 310 in the first cell may pick up transmissions from the mobile unit 320 located in the second cell.

The problem of intercell interference in a time division system is described in G. Povey et al., "TDD-CDMA Extension to FDD-CDMA Based Third Generation Cellular System", Proceedings of the ICUPC, IEEE (1997). Povey suggests synchronizing all of the cells in the network. In a large cellular network, however, this is an unrealistic and, most likely, a very complex proposal. Accordingly, there is a need to reduce and/or eliminate intercell interference due to asymmetric uplink/downlink traffic channel fields in a TDMA time frame.

SUMMARY OF THE INVENTION

The present invention provides a more effective technique for assigning (i.e., allocating) uplink and downlink radio channels in a TDD-TDMA based network. In general, the present invention accomplishes this by determining the level of susceptibility associated with each mobile unit during both the uplink and downlink period. The mobile unit is then assigned a radio channel in either or both the uplink and downlink traffic channel fields as a function of these determinations.

Accordingly, it is an object of the present invention to provide an effective channel allocation technique in a TDD-TDMA based network employing asymmetric TDMA time frames.

It is another object of the present invention to assign time slots for the uplink and/or downlink traffic channel fields in such a way that overall system performance increases.

It is still another object of the present invention to assign time slots for the uplink and/or downlink traffic channel fields in such a way that overall intercell interference decreases.

In accordance with one aspect of the present invention, the foregoing and other objects are achieved by a method and/or apparatus for allocating radio channels in a time division multiple access time frame which contains asymmetric downlink and uplink traffic channel fields. The method and/or apparatus involves, among other things, dividing the asymmetric downlink and uplink traffic channel fields into a number of regions, wherein each of the regions has associated with it an expected level of intercell interference. In addition, the level of susceptibility to intercell interference for each of a plurality of mobile units is continuously determined. Then, one region is selected and a radio channel from that region is allocated to one of the plurality of mobile units, based on the expected level of intercell interference associated with the selected region and the level of susceptibility to intercell interference for the mobile unit.

In accordance with another aspect of the present invention, the foregoing and other objects are achieved by a method and/or apparatus for allocating downlink and uplink channels, in a synchronous cellular radio telecommunications network that employs a time division multiple access (TDMA) channel allocation scheme, associated with a TDMA time frame which contains asymmetric downlink and uplink traffic channel fields. The method and/or apparatus involves dividing the downlink and uplink traffic channel fields into a total of at least three regions. The three regions include a first region exclusively coinciding with a portion of the downlink traffic channel field; a second region exclusively coinciding with a portion of the uplink traffic channel field; and a third region coinciding with a portion of the downlink traffic channel field and a portion of the uplink traffic channel field. The third region has associated with it an expected level of intercell interference that is greater than the expected level of intercell interference associated with the first or the second region. The method and/or apparatus also involves determining a level of susceptibility to intercell interference for each of a plurality of mobile units operating in a cell; and selecting one of the at least three regions and allocating an uplink or downlink channel to one of the plurality of mobile units operating in the cell as a function of a determination as to whether the channel is being allocated for uplink or downlink purposes and as a function of the level of susceptibility associated with the mobile unit.

BRIEF DESCRIPTION OF THE DRAWINGS

The objects and advantages of the present invention will be understood by reading the following detailed description in conjunction with the drawings in which.

DETAILED DESCRIPTION OF THE INVENTION

The present invention involves a technique for assigning time slots (i.e., radio channels) in the uplink and downlink traffic channel fields in a time division duplex, time division multiple access (TDD-TDMA) based cellular network. In accordance with the present invention, the time slots are assigned in such a way that the overall effect of cross-channel and co-channel, intercell interference (herein referred to as intercell interference), due to the employment of asymmetric uplink/downlink traffic channel fields, is significantly reduced. In part, the present invention accomplishes this by taking advantage of the fact that in a synchronous TDD-TDMA based cellular network, different regions (i.e., time periods) of the TDMA time frame experience different levels of intercell interference. In addition, it will be understood from the following discussion that the specific method or methods used to modulate and demodulate the uplink and downlink data within a given time slot do not affect the performance of the present invention. In other words, the present invention continues to provide an effective channel allocation technique regardless whether the uplink and/or downlink data is being modulated, for example, in accordance with a frequency modulation scheme, an amplitude modulation scheme, or a code division modulation scheme (e.g., wide-band CDMA).

Figure 4:
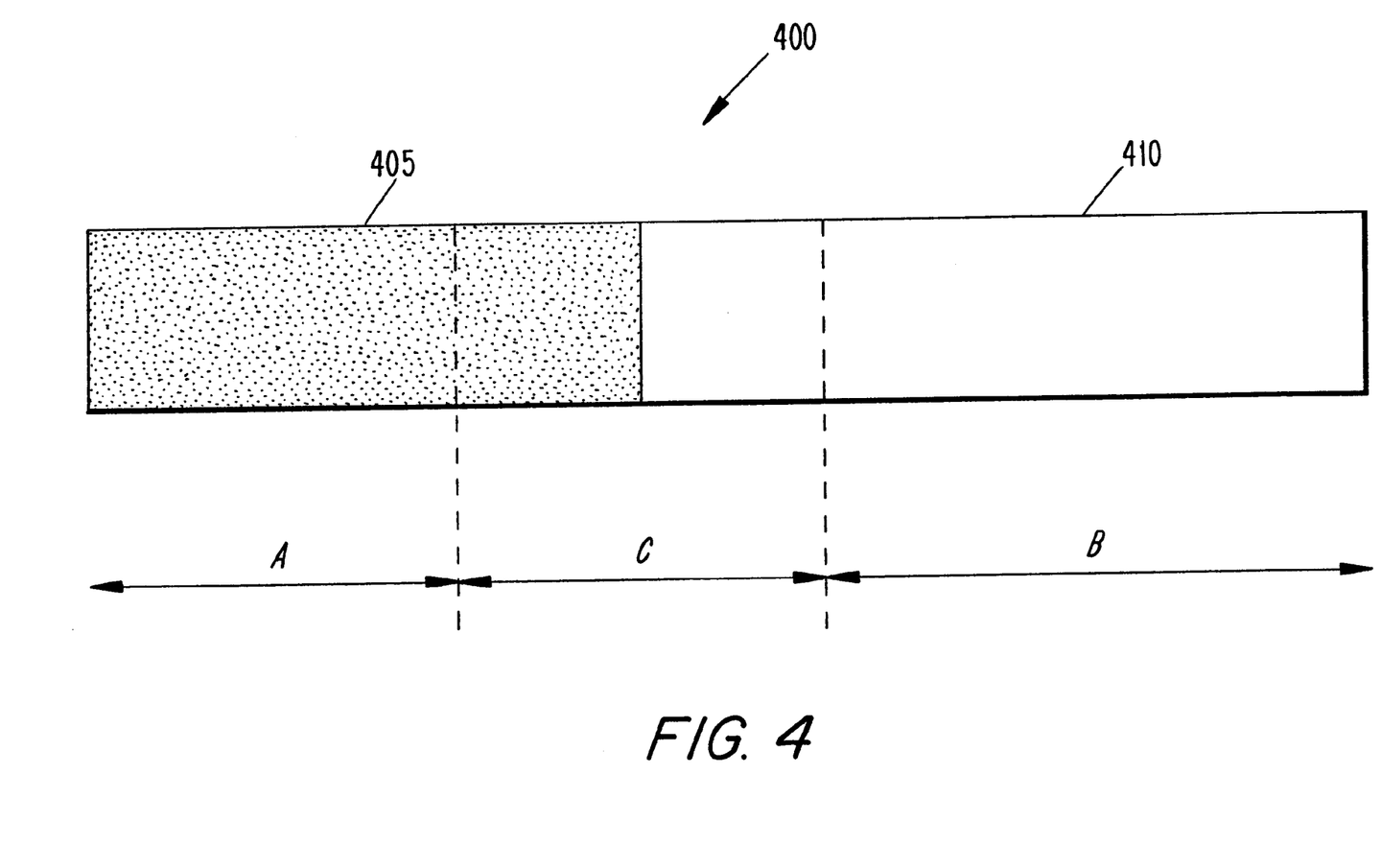
FIG. 4 illustrates the regions into which the uplink and downlink traffic channel fields are divided, in accordance with the present invention.

FIG. 4 shows a particular portion of a TDMA time frame 400, which includes the downlink traffic channel field 405 and the uplink traffic channel field 410. FIG. 4 also shows that the portion of the TDMA time frame 400 is divided into three regions: A, B and C, wherein region A coincides with a front portion of the downlink traffic channel field 405, region B coincides with a back portion of the uplink traffic channel field 410, and region C coincides with a middle section which overlaps both the downlink traffic channel field 405 and the uplink traffic channel field 410.

If the cellular network is, in fact, a synchronous network, it will be understood that each of the three regions A, B and C experience different intercell interference characteristics. For instance, in region A, there is a high probability that any intercell interference is the result of transmissions emanating from a base station in a neighboring or nearby cell. The reason being, during the beginning of the downlink period, in a synchronized cellular network, only base stations are transmitting, whereas active mobile units expecting information are not transmitting. In region B, there is a high probability that any intercell interference is the result of transmissions emanating from a mobile unit in a nearby cell sharing a common or reused frequency band. The reason being, during the end of the uplink period, in a synchronized cellular network, only mobile units are transmitting, whereas the base stations are not transmitting. However, due to the asymmetric nature of region C, mobile units and base stations may be transmitting energy. Hence, a more significant level of intercell interference is generally associated with region C compared to either region A or region B.

The present invention minimizes overall intercell interference, for example, by allocating mobile units to time slots in the downlink traffic channel field 405 and/or the uplink traffic channel field 410 in such a way that overall, intercell interference is minimized. For example, mobile units which are less susceptible to intercell interference emanating from a base station in a nearby cell and less susceptible to intercell interference emanating from mobile stations in a nearby cell, and then assigning them to time slots in region C. In contrast, mobile units which are more likely to be susceptible to intercell interference emanating from a base station in another cell, but not as susceptible to intercell interference emanating from other mobile units, are then assigned to a time slot in region B rather than region C for uplink purposes. Similarly, mobile units which are more likely to be susceptible to intercell interference emanating from other mobile units, but not as susceptible to intercell interference emanating from a base station in another cell, are then assigned to a time slot in region A rather than region C for downlink purposes.

Figure 5:
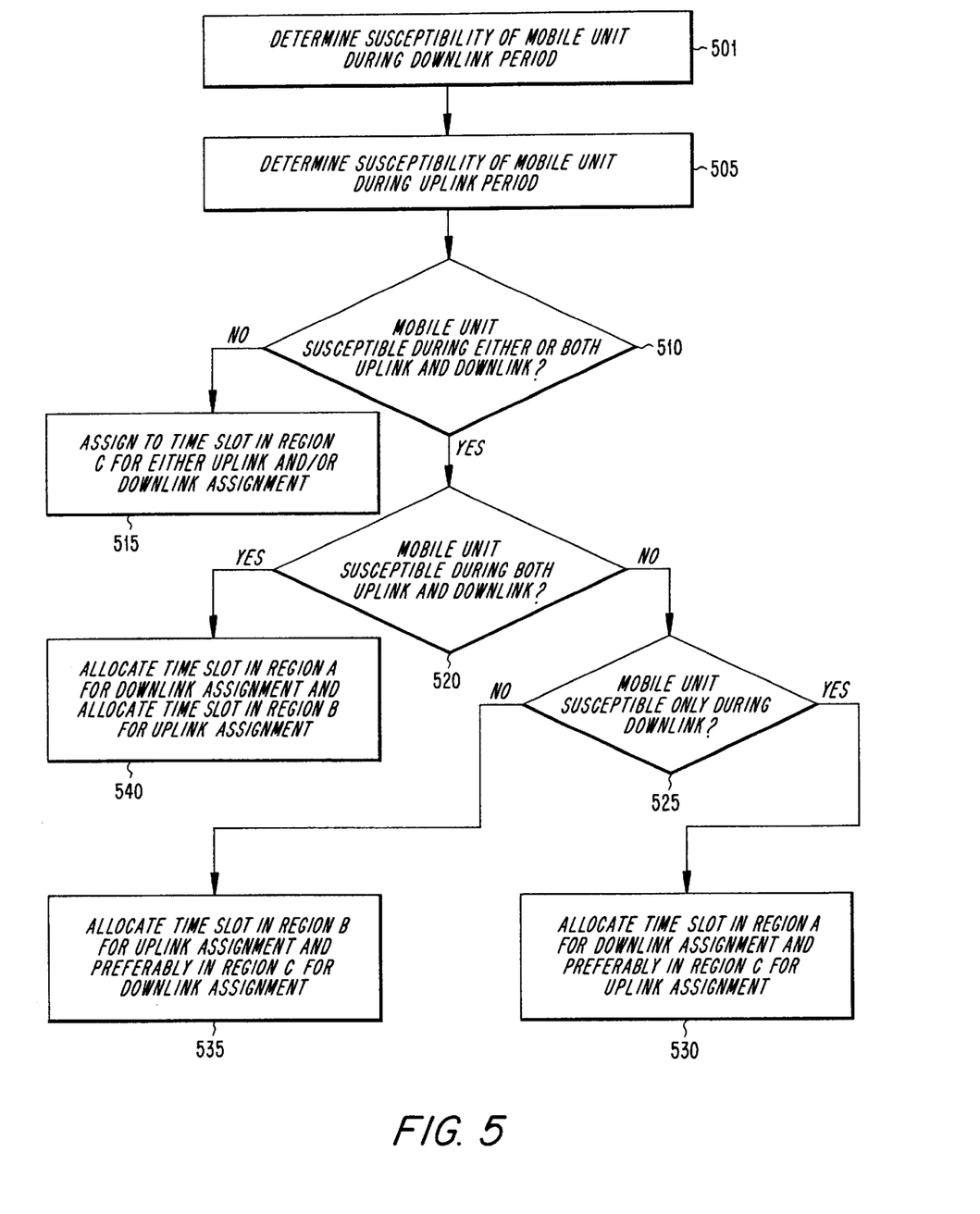
FIG. 5 illustrates a technique for assigning uplink and downlink channels, in accordance with the present invention.

FIG. 5. shows a flowchart depicting the technique described above. In FIG. 5, the susceptibility of a mobile unit to intercell interference, or lack thereof, during a downlink period is determined in accordance with step 501.

The susceptibility of the mobile unit to intercell interference, or lack thereof, during an uplink period is determined in accordance with step 505. Then, in accordance with decision block 510, a determination is made as to whether the mobile station is susceptible to intercell interference during either or both the uplink or downlink period. If it is determined that the mobile station is not susceptible to intercell interference during either the uplink or downlink period, in accordance with the "NO" path out of decision step 510, the mobile unit can be assigned a time slot in region C (see FIG. 4) for uplink and/or downlink purposes, as shown in step 515. However, if it is determined that the mobile station is susceptible to intercell interference during either or both the uplink and downlink periods, in accordance with the "YES" path out of decision step 510, then a determination is made as to whether the mobile unit is susceptible to intercell interference during both the uplink and downlink periods, in accordance with decision step 520. If it is determined that the mobile unit is not susceptible to intercell interference during both the uplink and downlink periods, in accordance with the "NO" path out of decision step 520, then yet another determination is made as to whether the mobile unit is susceptible to intercell interference only during the downlink period, as shown in decision step 525. If the mobile unit is susceptible to intercell interference only during the downlink period, in accordance with decision step 525, a time slot associated with region A can be allocated to the mobile unit for the purpose of receiving information from the base station during the downlink period, and preferably, a time slot associated with region C can be allocated for the purpose of transmitting information to the base station during the uplink period, in accordance with step 530. If the mobile unit is not susceptible to intercell interference during the downlink period, in accordance with the "NO" path out of decision step 525, then it is assumed that the mobile unit is susceptible to intercell interference only during the uplink period. Hence, the mobile can be assigned a time slot in region B for the purpose of transmitting information to the base station during the uplink period, and preferably, a time slot associated with region C can be allocated to the mobile unit for the purpose of receiving information from the base station during the downlink period, as shown in step 535. If, however, the mobile unit is susceptible to intercell interference during both the downlink and uplink periods, in accordance with the "YES" path out of decision step 520, a time slot associated with region A can be allocated to the mobile unit for the purpose of receiving information from the base station during the downlink period, as shown in step 545, and a time slot associated with region B can be allocated to the mobile unit for the purpose of transmitting information to the base station during the uplink period.

As stated above, a decision must be made as to whether a mobile unit is susceptible to intercell interference during either or both of the uplink and downlink periods. In a preferred embodiment of the present invention, the decision as to whether a mobile unit is or is not susceptible to intercell interference during either or both the uplink period or downlink period is based upon a measure of signal strength. In other words, the strength of the signal transmitted by the mobile unit during the uplink period, and the strength of the signal received by the mobile unit from the base station during the downlink period can be measured. The measured signal strength values are then compared to a pre-defined threshold values. A signal strength measurement above the threshold value might indicate a lack of susceptibility to intercell interference, while a signal strength measurement below the threshold value might indicate a susceptibility to intercell interference. One skilled in the art will appreciate that a measure of signal quality, for example, bit error rate (BER) or data packet error rate (PER), could also be utilized as an indication of susceptibility to intercell interference during the uplink and downlink periods, or a lack thereof.

In an alternative embodiment, the signal strength and/or signal quality for each active mobile unit in the cell is continuously measured. The mobile units are then ranked in order from those exhibiting the weakest signal strength and/or signal quality to those exhibiting the strongest signal strength and/or signal quality. Mobile units exhibiting strong signal strength and/or signal quality characteristics are assigned time slots in region C. Mobile units exhibiting relatively weak signal strength and/or signal quality characteristics are assigned time slots in regions A or B.

The present invention has been described with reference to a number of exemplary embodiments. However, it will be readily apparent to those skilled in the art that it is possible to embody the invention in specific forms other than those of the exemplary embodiments described above. This may be done without departing from the spirit of the invention. These exemplary embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method for allocating radio channels in a time division multiple access time frame which contains asymmetric downlink and uplink traffic channel fields, said method comprising the steps of:

dividing the asymmetric downlink and uplink traffic channel fields into a number of regions, wherein each region has associated with it an expected level of intercell interference, wherein the asymmetric downlink and uplink traffic channel fields together are divided into a total of three regions, and wherein a first region coincides only with the downlink traffic channel field, a second region coincides only with the uplink traffic channel field, and a third region coincides with a portion of the downlink traffic channel field and a portion of the uplink traffic channel field;

determining a level of susceptibility to intercell interference for each of a plurality of mobile units; and selecting the third region and assigning a radio channel in the third region to the one mobile unit, if it is determined that the one mobile unit has a low level of susceptibility to intercell interference, wherein the expected level of intercell interference associated with the third region is greater than the expected level of intercell interference associated with the first and the second regions.

2. The method of claim 1, wherein said step of determining a level of susceptibility to intercell interference for each of the plurality of mobile units comprises the step of:

measuring signal strength associated with each of the plurality of mobile units.

3. The method of claim 1, wherein said step of determining a level of susceptibility to intercell interference for each of the plurality of mobile units comprises the step of:

measuring signal quality associated with each of the plurality of mobile units.

4. A method for allocating radio channels in a time division multiple access time frame which contains asymmetric downlink and uplink traffic channel fields, said method comprising the steps of:

dividing the asymmetric downlink and uplink traffic channel fields into a number of regions, wherein each region has associated with it an expected level of intercell interference, wherein the asymmetric downlink and uplink traffic channel fields together are divided into a total of three regions, and wherein a first region coincides only with the downlink traffic channel field, a second region coincides only with the uplink traffic channel field, and a third region coincides with a portion of the downlink traffic channel field and a portion of the uplink traffic channel field;

determining a level of susceptibility to intercell interference for each of a plurality of mobile units; and selecting the first region and assigning a downlink radio channel in the first region to the one mobile unit, if it is determined that the one mobile unit has a high level of susceptibility to intercell interference, wherein the expected level of intercell interference associated with the first region is lower than the expected level of intercell interference associated with the third region.

5. The method of claim 4, wherein said step of determining a level of susceptibility to intercell interference for each of the plurality of mobile units comprises the step of:

measuring signal strength associated with each of the plurality of mobile units.

6. The method of claim 4, wherein said step of determining a level of susceptibility to intercell interference for each of the plurality of mobile units comprises the step of:

measuring signal quality associated with each of the plurality of mobile units.

7. A method for allocating radio channels in a time division multiple access time frame which contains asymmetric downlink and uplink traffic channel fields, said method comprising the steps of:

dividing the asymmetric downlink and uplink traffic channel fields into a number of regions, wherein each region has associated with it an expected level of intercell interference, wherein the asymmetric downlink and uplink traffic channel fields together are divided into a total of three regions, and wherein a first region coincides only with the downlink traffic channel field, a second region coincides only with the uplink traffic channel field, and a third region coincides with a portion of the downlink traffic channel field and a portion of the uplink traffic channel field;

determining a level of susceptibility to intercell interference for each of a plurality of mobile units; and selecting the second region and assigning a uplink radio channel in the second region to the one mobile unit, if it is determined that the one mobile unit has a high level of susceptibility to intercell interference, wherein the expected level of intercell interference associated with the second region is lower than the expected level of intercell interference associated with the third region.

8. The method of claim 7, wherein said step of determining a level of susceptibility to intercell interference for each of the plurality of mobile units comprises the step of:

measuring signal strength associated with each of the plurality of mobile units.

9. The method of claim 7, wherein said step of determining a level of susceptibility to intercell interference for each of the plurality of mobile units comprises the step of:

measuring signal quality associated with each of the plurality of mobile units.

10. In a synchronous cellular radio telecommunications network that employs a time division multiple access (TDMA) channel allocation scheme, a method for allocating downlink and uplink channels associated with a TDMA time frame which contains asymmetric downlink and uplink traffic channel fields, said method comprising the steps of:

dividing the downlink and uplink traffic channel fields into a total of at least three regions, wherein the at least three regions include:

a first region exclusively coinciding with a portion of the downlink traffic channel field, a second region exclusively coinciding with a portion of the uplink traffic channel field, a third region coinciding with a portion of the downlink traffic channel field and a portion of the uplink traffic channel field, wherein the third region has associated with it an expected level of intercell interference that is greater than the expected level of intercell interference associated with the first or the second region;

determining a level of susceptibility to intercell interference for each of a plurality of mobile units operating in a cell comprises the steps of:

measuring susceptibility to intercell interference during an uplink period; and measuring susceptibility to intercell interference during a downlink period; and assigning an uplink or downlink channel in the third region to the one mobile unit, if it is determined that the one mobile unit has a low level of susceptibility to intercell interference as measured during the uplink period and a relatively low level of susceptibility to intercell interference as measured during the downlink period.

11. The method of claim 10, wherein said step of determining a level of susceptibility to intercell interference for each of the plurality of mobile units operating in the cell further comprises the steps of:

measuring a signal strength associated with the mobile unit; and comparing the signal strength measurement to a predefined threshold value.

12. The method of claim 10, wherein said step of determining a level of susceptibility to intercell interference for each of the plurality of mobile units operating in the cell further comprises the steps of:

measuring a signal quality associated with the mobile unit; and comparing the signal quality measurement to a predefined threshold value.

13. The method of claim 12, wherein said step of measuring the signal quality comprises the step of:

measuring a bit error rate (BER).

14. The method of claim 12, wherein said step of measuring the signal quality comprises the step of:

measuring a packet error rate (PER).

15. The method of claim 10 further comprising the step of:

ranking each of the plurality of mobile units operating in the cell based on the level of susceptibility to intercell interference associated with each of the plurality of mobile units.

16. The method of claim 15, wherein said step of assigning an uplink or downlink channel is accomplished as a function of the ranking of the one mobile unit.

17. The method of claim 10, further comprises the step of:

assigning a downlink channel in the first region to the one mobile unit, if it is determined that the one mobile unit has a high level of susceptibility to intercell interference as measured during the downlink period.

18. The method of claim 10, further comprises the step of:
assigning an uplink channel in the second region to the one mobile unit, if it is determined that the one mobile unit has a high level of susceptibility to intercell interference as measured during the uplink period.

19. An apparatus for allocating radio channels in a time division multiple access time frame which contains asymmetric downlink and uplink traffic channel fields, said apparatus comprising:
means for dividing the asymmetric downlink and uplink traffic channel fields into a number of regions, wherein each region has associated with it an expected level of intercell interference, wherein the asymmetric downlink and uplink traffic channel fields together are divided into a total of three regions, and wherein a first region coincides only with the downlink traffic channel field, a second region coincides only with the uplink traffic channel field, and a third region coincides with a portion of the downlink traffic channel field and a portion of the uplink traffic channel field;
means for determining a level of susceptibility to intercell interference for each of a plurality of mobile units; and
means for selecting the third region and for assigning a radio channel in the third region to the one mobile unit, if it is determined that the one mobile unit has a low level of susceptibility to intercell interference, wherein the expected level of intercell interference associated with the third region is greater than the expected level of intercell interference associated with the first and the second regions.

20. The apparatus of claim 19, wherein said means for determining a level of susceptibility to intercell interference for each of the plurality of mobile units comprises:
means for measuring signal strength associated with each of the plurality of mobile units.

21. The apparatus of claim 19, wherein said means for determining a level of susceptibility to intercell interference for each of the plurality of mobile units comprises:
means for measuring signal quality associated with each of the plurality of mobile units.

22. An apparatus for allocating radio channels in a time division multiple access time frame which contains asymmetric downlink and uplink traffic channel fields, said apparatus comprising:
means for dividing the asymmetric downlink and uplink traffic channel fields into a number of regions, wherein each region has associated with it an expected level of intercell interference, wherein the asymmetric downlink and uplink traffic channel fields together are divided into a total of three regions, and wherein a first region coincides only with the downlink traffic channel field, a second region coincides only with the uplink traffic channel field, and a third region coincides with a portion of the downlink traffic channel field and a portion of the uplink traffic channel field;
means for determining a level of susceptibility to intercell interference for each of a plurality of mobile units; and
means for selecting the first region and for assigning a downlink radio channel in the first region to the one mobile unit, if it is determined that the one mobile unit has a high level of susceptibility to intercell interference, wherein the expected level of intercell interference associated with the first region is lower than the expected level of intercell interference associated with the third region.

23. The apparatus of claim 22, wherein said means for determining a level of susceptibility to intercell interference for each of the plurality of mobile units comprises:
means for measuring signal strength associated with each of the plurality of mobile units.

24. The apparatus of claim 22, wherein said means for determining a level of susceptibility to intercell interference for each of the plurality of mobile units comprises:
means for measuring signal quality associated with each of the plurality of mobile units.

25. An apparatus for allocating radio channels in a time division multiple access time frame which contains asymmetric downlink and uplink traffic channel fields, said apparatus comprising:
means for dividing the asymmetric downlink and uplink traffic channel fields into a number of regions, wherein each region has associated with it an expected level of intercell interference, wherein the asymmetric downlink and uplink traffic channel fields together are divided into a total of three regions, and wherein a first region coincides only with the downlink traffic channel field, a second region coincides only with the uplink traffic channel field, and a third region coincides with a portion of the downlink traffic channel field and a portion of the uplink traffic channel field;
means for determining a level of susceptibility to intercell interference for each of a plurality of mobile units; and
means for selecting the second region and for assigning a uplink radio channel in the second region to the one mobile unit, if it is determined that the one mobile unit has a high level of susceptibility to intercell interference, wherein the expected level of intercell interference associated with the second region is lower than the expected level of intercell interference associated with the third region.

26. The apparatus of claim 25, wherein said means for determining a level of susceptibility to intercell interference for each of the plurality of mobile units comprises:
means for measuring signal strength associated with each of the plurality of mobile units.

27. The apparatus of claim 25, wherein said means for determining a level of susceptibility to intercell interference for each of the plurality of mobile units comprises:
means for measuring signal quality associated with each of the plurality of mobile units.

28. In a synchronous cellular radio telecommunications network that employs a time division multiple access (TDMA) channel allocation scheme, an apparatus for allocating downlink and uplink channels associated with a TDMA time frame which contains asymmetric downlink and uplink traffic channel fields, said apparatus comprising:
means for dividing the downlink and uplink traffic channel fields into a total of at least three regions, wherein the at least three regions include:
a first region exclusively coinciding with a portion of the downlink traffic channel field,
a second region exclusively coinciding with a portion of the uplink traffic channel field,
a third region coinciding with a portion of the downlink traffic channel field and a portion of the uplink traffic channel field, wherein the third region has associated with it an expected level of intercell interference that is greater than the expected level of intercell interference associated with the first or the second region;
means for determining a level of susceptibility to intercell interference for each of a plurality of mobile units operating in a cell including:
means for measuring susceptibility to intercell interference during an uplink period; and means for measuring susceptibility to intercell interference during a downlink period; and means for assigning an uplink or downlink channel in the third region to the one mobile unit, if it is determined that the one mobile unit has a low level of susceptibility to intercell interference as measured during the uplink period and a relatively low level of susceptibility to intercell interference as measured during the downlink period.

29. The apparatus of claim 28, wherein said means for determining a level of susceptibility to intercell interference for each of the plurality of mobile units operating in the cell further comprises:

means for measuring a signal strength associated with the mobile unit; and means for comparing the signal strength measurement to a pre-defined threshold value.

30. The apparatus of claim 28, wherein said means for determining a level of susceptibility to intercell interference for each of the plurality of mobile units operating in the cell further comprises:

means for measuring a signal quality associated with the mobile unit; and means for comparing the signal quality measurement to a pre-defined threshold value.

31. The apparatus of claim 30, wherein said means for measuring the signal quality comprises:

means for measuring a bit error rate (BER).

32. The apparatus of claim 30, wherein said means for measuring the signal quality comprises:

means for measuring a packet error rate (PER).

33. The apparatus of claim 28 further comprising:

means for ranking each of the plurality of mobile units operating in the cell based on the level of susceptibility to intercell interference associated with each of the plurality of mobile units.

34. The apparatus of claim 33, wherein said means for selecting one of the at least three regions and for allocating an uplink or downlink channel to one of the plurality of mobile units operating in the cell is accomplished as a function of the ranking of the one mobile unit.

35. The apparatus of claim 28, wherein said means for assigning an uplink or downlink channel further comprises:

means for assigning a downlink channel in the first region to the one mobile unit, if it is determined that the one mobile unit has a high level of susceptibility to intercell interference as measured during the downlink period.

36. The apparatus of claim 28, wherein said means for assigning an uplink or downlink channel further comprises:

means for assigning an uplink channel in the second region to the one mobile unit, if it is determined that the one mobile unit has a high level of susceptibility to intercell interference as measured during the uplink period.

* * * * *